United States Patent [19]

Sherby

[11] Patent Number: 5,003,729
[45] Date of Patent: Apr. 2, 1991

[54] SUPPORT SYSTEM FOR ABRASIVE JET CUTTING

[75] Inventor: James E. Sherby, Wilkinsburg Township, Allegheny County, Pa.

[73] Assignee: PPG Industries, Inc., Pittsburgh, Pa.

[21] Appl. No.: 255,219

[22] Filed: Oct. 11, 1988

[51] Int. Cl.$^5$ .............................................. B24C 1/00
[52] U.S. Cl. ..................... 51/283 R; 83/53;
83/177; 51/410; 51/235; 51/217 R
[58] Field of Search ........... 51/283 R, 283 E, 217 R,
51/215 CP, 240 R, 240 GB, 235, 410; 83/53, 177

[56] References Cited

U.S. PATENT DOCUMENTS

| | | | |
|---|---|---|---|
| 178,403 | 6/1876 | Brockman | 51/240 GB |
| 497,115 | 5/1893 | Brockman | 51/240 GB |
| 750,667 | 1/1904 | Lewellyn et al. | 51/235 |
| 1,851,028 | 3/1932 | Worrall . | |
| 2,379,054 | 6/1945 | Zuk | 51/235 |
| 2,985,050 | 5/1961 | Schwacha | 51/410 |
| 3,212,378 | 10/1965 | Rice | 51/321 |
| 3,366,857 | 4/1968 | Jewell et al. . | |
| 3,532,014 | 10/1970 | Franz . | |
| 3,711,082 | 1/1973 | Seidenfaden | 51/235 |
| 3,877,344 | 4/1975 | Gerber . | |
| 3,888,054 | 6/1975 | Macelli | 51/319 |
| 4,380,138 | 4/1983 | Hofer | 51/321 |
| 4,426,811 | 1/1984 | Echardt et al. | 51/283 E |
| 4,656,791 | 4/1987 | Herrington et al. | 51/240 GB |
| 4,702,042 | 10/1987 | Herrington et al. . | |
| 4,703,591 | 11/1987 | Herrington et al. | 51/410 |
| 4,787,178 | 11/1988 | Morgan et al. | 51/215 CP |

Primary Examiner—James G. Smith
Assistant Examiner—Blynn Shideler
Attorney, Agent, or Firm—Andrew C. Siminerio; Donald C. Lepiane

[57] ABSTRACT

A sheet support assembly for fluid jet cutting operation having a first support extending through and independent of a catcher tank of the cutting jet system to support the central portion of said sheet and a frame assembly mounted independent of said catcher tank to support selected edge portions of the sheet to be cut. The first support includes a vertically adjustable vacuum plenum to secure the sheet thereto. The sheet edge supports on the frame are vertically and horizontally adjustable so that they may support the edges of a variety of sheet sizes.

19 Claims, 4 Drawing Sheets

SUPPORT SYSTEM FOR ABRASIVE JET CUTTING

BACKGROUND OF THE INVENTION

1. Field of the Invention

The present invention relates to cutting sheet material and in particular to an arrangement for supporting a sheet during cutting using an abrasive cutting fluid system.

2. Technical Considerations

Shaped glass sheets are widely used as transparencies such as windows for automobiles and the like. To be suitable for such applications, glass sheets must be cut to a predetermined outline and shaped to a predetermined surface contour to precisely define the outline of the window opening in the vehicle. One commonly known method of cutting glass sheets is the use of an abrasive fluid jet cutting device. In particular, an abrasive jet device includes a pressurized fluid, such as water, combined with an abrasive material to form a cutting fluid which is discharged from a nozzle in a high velocity, narrow cutting stream to penetrate the full thickness of the glass sheet. The spent abrasive jet fluid is deposited in a tank below the glass sheet which decreases the velocity of the abrasive cutting stream and negates its cutting capabilities.

It would be advantageous to support the glass sheet in such a manner so as to isolate the glass and support from any conditions that may effect the accuracy of the cutting, such as vibration from the abrasive jet cutting device or the abrasive fluid catcher tank.

PATENTS OF INTEREST

U.S. Pat. No. 750,661 to Lewellyn et al. teaches a vacuum frame including a plurality of interconnected suction holders forming a grid work to support a glass sheet.

U.S. Pat. No. 1,851,028 to Worral teaches a pedestal supported vacuum table having interconnected suction cups positioned in the table to hold a sheet article against the table surface.

U.S. Pat. No. 3,366,857 to Jewell et al. teaches a line tracers device in which a particular configuration is scanned and transferred to a cutting device to reproduce the scanned configuration. The steel sheet to be cut is supported in proper relationship to a cutting head on beams positioned along its edges.

U.S. Pat. No. 3,877,334 to Gerber teaches a fluid jet cutting arrangement to cut patterned pieces from limp material. A main support structure supports both the material to be cut and the fluid jet cutting device.

U.S. Pat. No. 4,656,791 to Herrington et al. teaches an abrasive fluid jet cutting support having first and second glass sheet support members mounted on the cutting fluid catcher tank. The members have a space therebetween defining the perimeter of the shape of the sheet to be cut.

U.S. Pat. Nos. 2,985,050 to Schwacha; 3,212,378 to Rice; 3,532,014 to Franz; and 4,702,042 to Herrington et al. each teach fluid jet cutting systems for soft or rigid materials.

SUMMARY OF THE INVENTION

The present invention teaches a glass sheet support arrangement for use with an abrasive jet cutting device wherein the glass sheet is supported independently of the cutting device and a catcher tank which captures spent cutting fluid after the cutting operation. In particular, a central support stand with a vacuum holder at its upper end extends through the catcher tank and supports the central portion of the glass sheet to be cut. A sheet edge support stand mounted independently from the catcher tank, includes rail members and sliding cross beams which extend across the tank. The cross beams employ moveable clamping members to hold selected edge portions of the sheet and secure it in place while the vacuum head supports the central portion of the glass. This glass sheet support arrangement completely isolates the glass sheet from any vibration or movement that may be caused by or transferred through the catcher tank to the glass sheet during the cutting operation.

DETAILED DESCRIPTION OF THE INVENTION

Figure 1:
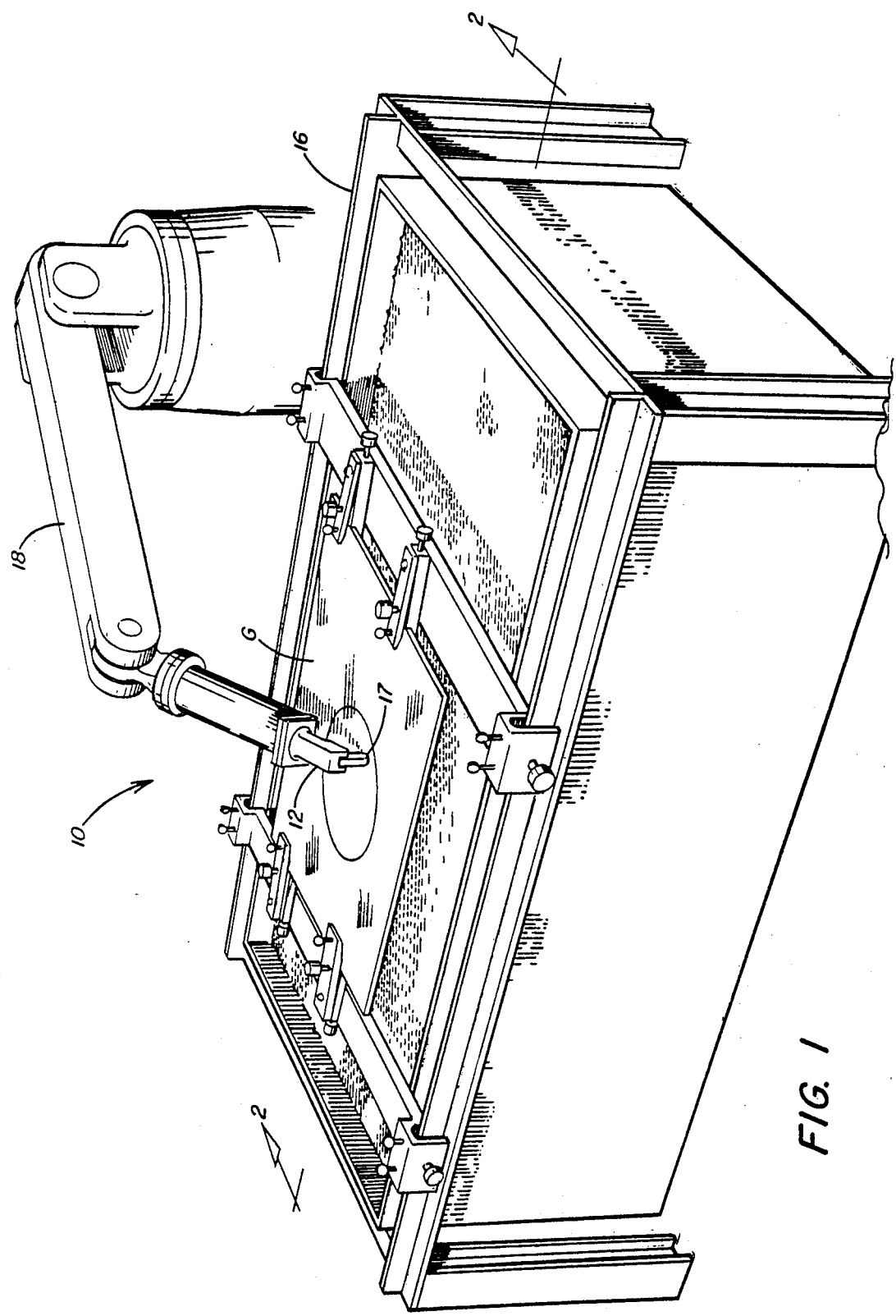
FIG. 1 is isometric view of an abrasive jet cutting system with a glass sheet support arrangement incorporating the features of the present invention.
Figure 2:
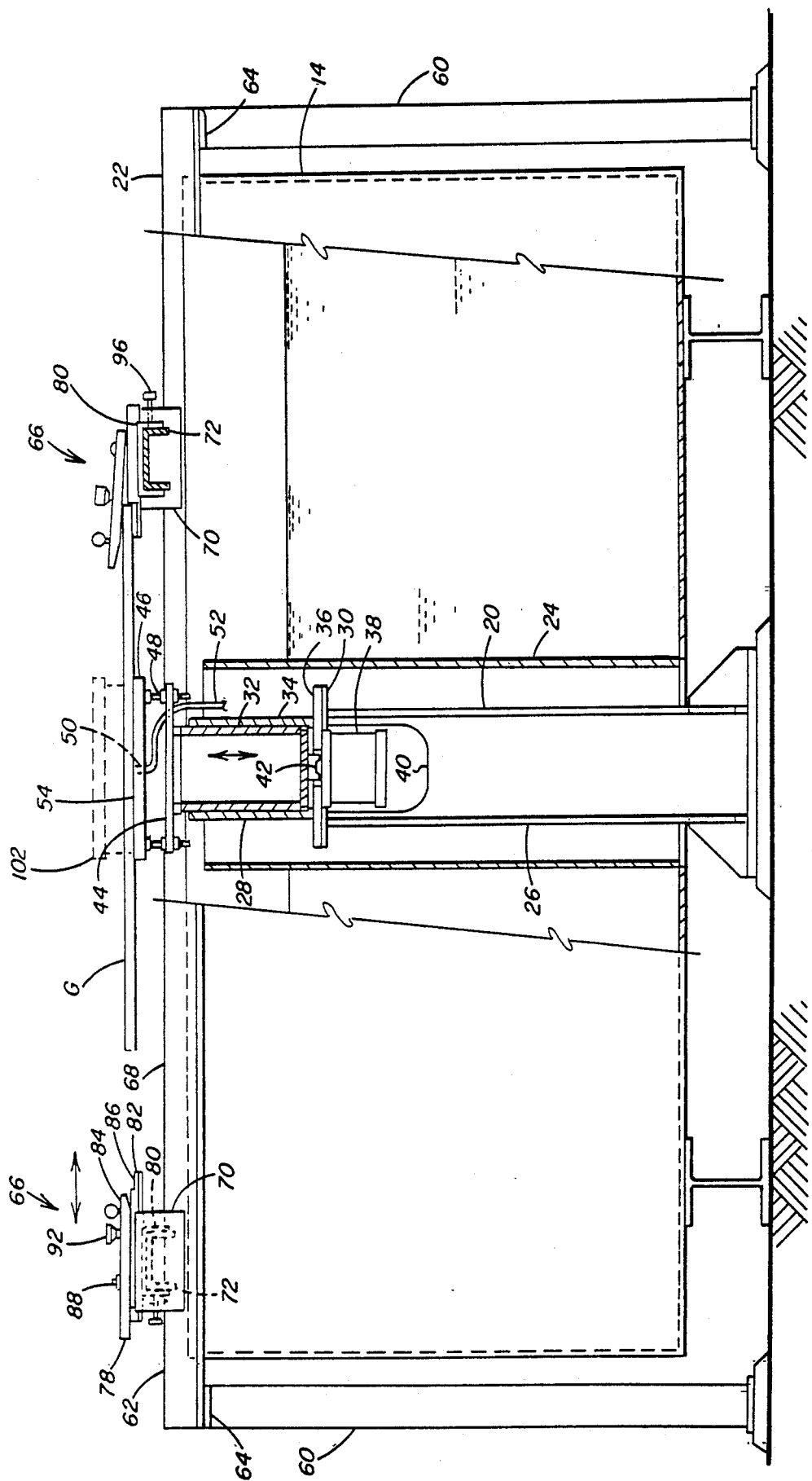
FIG. 2 is a cross-section through line 2—2 in FIG. 1 showing the sheet support frame with glass edge support members and a central sheet support illustrated in FIG. 1.

Referring to FIG. 1 the cutting system 10 includes an abrasive jet system 12, a catcher tank 14, and a glass sheet support arrangement 16, incorporating features of the present invention. Although not limiting in the present invention, nozzle 17 of the abrasive jet system 12 may be mounted at the end of the arm of a robot 18 which is programmed to move the nozzle 17 about supported glass sheet G to cut the sheet to the desired configuration. High pressure cutting fluid lines (not shown) deliver cutting fluid to the nozzle 17 where it may be combined with abrasive materials and discharged from the nozzle 17 under high pressure to penetrate and cut the glass sheet G. The catcher tank 14 is positioned below the glass sheet G and nozzle 17 to collect the spent cutting fluid. Tank 14 is preferably filled with liquid, such as water, as shown in FIG. 2 to reduce the velocity of the cutting fluid and dissipate its cutting capabilities. Catcher tank 14 is preferably made of steel construction and may be provided, if required, with an abrasive resistant lining to further protect the inner surface of the tank 14 from the cutting fluid.

Figure 3:
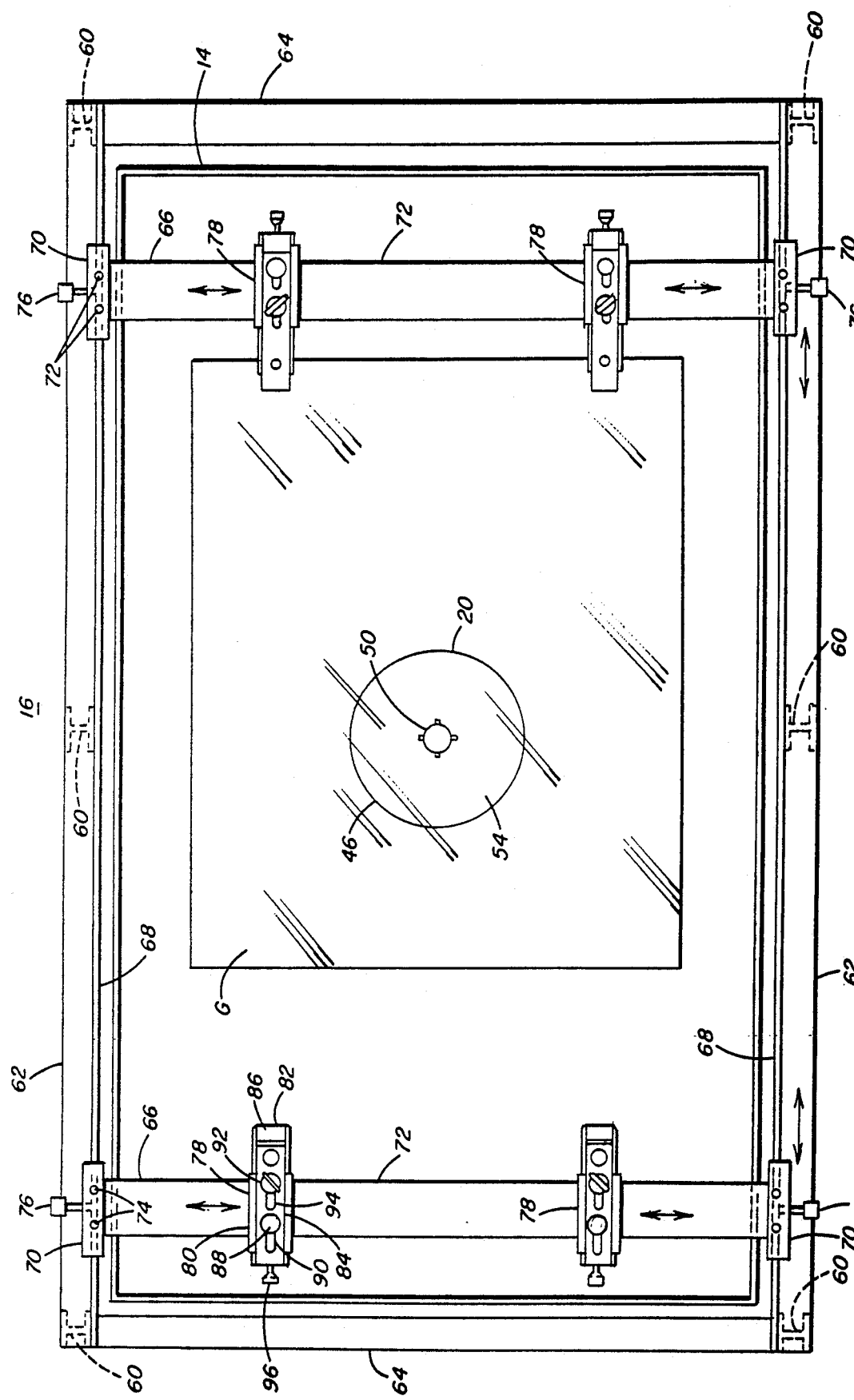
FIG. 3 is a top view of the support frame arrangement shown in FIG. 2.

Referring the FIGS. 2 and 3, the glass sheet support arrangement 16 includes a central support pedestal 20 and an edge support frame 22. The pedestal 20 extends through pipe 24 in catcher tank 14 and includes a wide flange section 26 mounted directly to the floor, independent from the catcher tank 14. Glass sheet support assembly 28 is mounted directly to plate 30 of the wide flange section 26 and includes a lift slide 32 which moves within casing 34 which in turn is secured to mounting plate 36. Piston 38 which may be operated in any convenient manner, e.g., by a pneumatic or hydraulic drive system, is secured to plate 36 and extends within slot 40 of the section 26. Arm 42 of piston 38 is secured to the lower end of lift slide 32 so as to move the slide 32 within casing 34 and vertically reciprocate rigid backing plate 44 which is positioned at the upper end of the lift slide 32. Vacuum plate 46 is mounted on plate 44 via leveling bolts 48 and includes openings 50 for vacuum line 52 which draws a vacuum along upper surface 54 of vacuum plate 46 to secure a glass sheet thereto.

Figure 4:
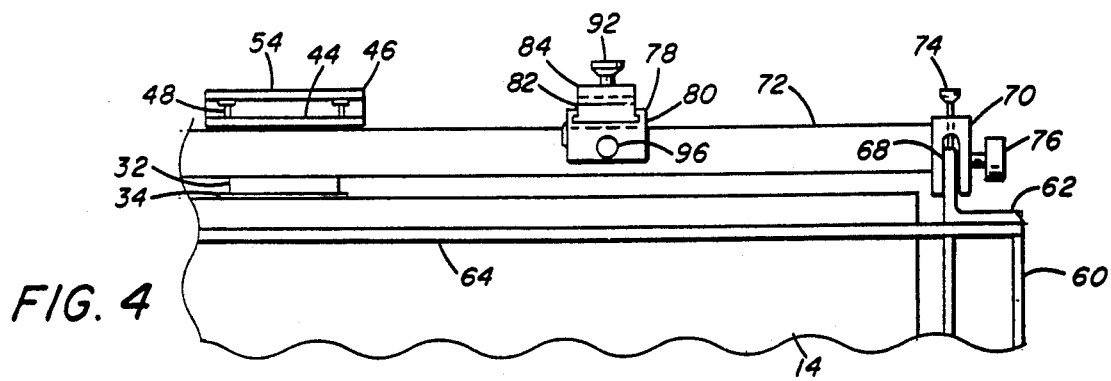
FIG. 4 is an end view of the support frame shown in FIG. 2 showing the glass sheet edge supports and sliding rail assembly.

With continued reference to FIGS. 2 and 3, support frame 22 includes column members 60 mounted on the floor and spaced about the periphery of the catcher tank 14. Longitudinally extending bars 62 and transversely extending bars 64 interconnect the upper ends of columns 60. Assemblies 66 are slidingly supported at their opposing ends by bars 62. Although not limiting in the present invention, in the particular embodiment illustrated in FIGS. 2 through 4, bars 62 are an L-shaped section wherein the vertically disposed legs 68 of the bar operates as a guide member. Slides 70 at opposing ends of cross beams 72 of each assembly 66 are U-shaped members that receive leg 68 of bar 62 so that each assembly 66 may slide therealong. Vertical adjusting bolts 74 extend through the slides 70 into contact with legs 68 to adjust the vertical height of each assembly 66. Locking bolts 76 extend through slides 70 to secure each assembly 66 in a fixed position on bars 62.

Cross beam 72 of each assembly 66 further includes slideably mounted glass edge supports 78 which are provided with a block 80, lower support 82, and upper clamp 84. Lower support 82 includes a ledge 86 to align the edge of the glass sheet G. Hold down bolt 88 extends through slot 90 and tightening bolt 92 extends through slot 94 of clamp 84 to bias the clamp 84 downwardly against the lower support 82 and secure the edge of the glass sheet G when positioned therebetween. The block 80 is supported by and slides along the cross beam 72 to position the glass edge supports 78. Lock bolts 96 extend through block 80 and abut cross beam 72 to fix the position of the glass edge support 78.

In operation, piston 38 adjusts the position of vacuum plate 46 via lift slide 32 to a desired position relative to the glass edge supports 78. Although not limiting in the present invention, vacuum plate 46 is positioned such that the lower surface of the glass sheet G supported on the pedestal 20 is slightly below the supporting surface of the ledge 86 so that the upper surface of the glass sheet G is in slight compression. This arrangement is recommended and particularly recommended when cutting thin glass, i.e., glass having a thickness dimension less than approximately 0.188 inches (0.47 cm) because if the upper surface of the glass sheet is allowed to go into tension, the cutting action of the abrasive jet may result in uncontrolled venting of the glass that will cause the glass to fracture prior to completion of the cutting operation. The glass sheet G is positioned on ledges 86 of supports 78 of the frame 22 as shown in the right hand portion of FIGS. 2 and 3. Clamps 84 are positioned over the upper surface of the glass sheet G, pivoting about hold down bolts 88, and are tightened by bolts 92 to secure the edge portion of the glass sheet G in place. Vacuum line 52 connected to a vacuum source (not shown) draws a vacuum along face 54 of the vacuum plate 46 to help secure the glass sheet G in a fixed position prior to the cutting operation.

Figure 5:
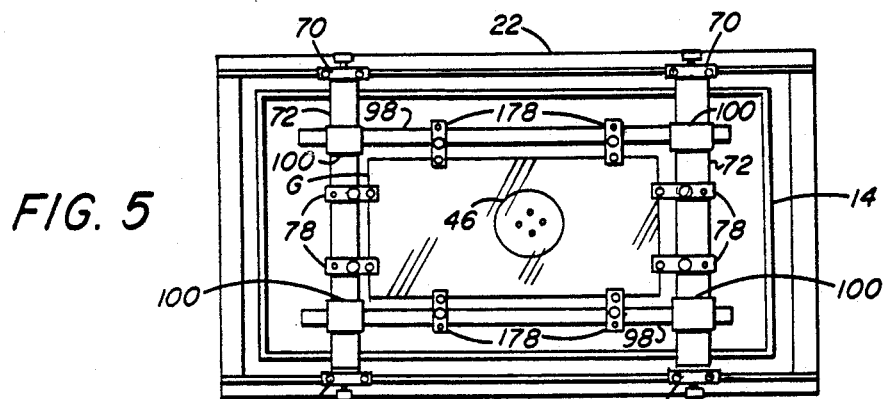
FIG. 5 is a top view similar to FIG. 3 of an alternate embodiment of the invention illustrating additional glass edge support members.

Additional glass edge supports may be utilized to support the glass sheet G on all four sides. Referring to FIG. 5, glass edge supports 178 which are similar to supports 78 are slideably mounted on beams 98 which in turn are slideably supported via blocks 100 by cross beams 72 of assemblies 66. With this arrangement, the pairs of beams 72 and 98 may move toward and away from each other to provide support for a variety of different glass sheet block sizes.

It is contemplated that the support arrangement 16 may also be used to support the cut glass sheet for further processing operations. For example, an edging wheel may be positioned on the end of the arm of a robot (not shown) to edge the glass sheet after cutting. In order to the move the cut glass part away from the remaining salvage glass, the cylinder 38 can raise the vacuum plate 46 with the glass sheet G supported thereagainst to a level as indicated by phantom line 102 in FIG. 2.

Figure 7:
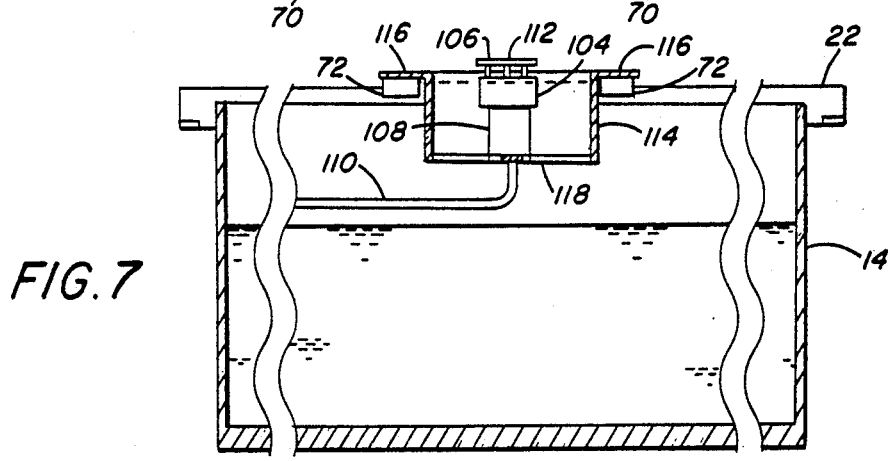
FIG. 7 is a view through line 7—7 in FIG. 6 with portions removed for clarity.
Figure 6:
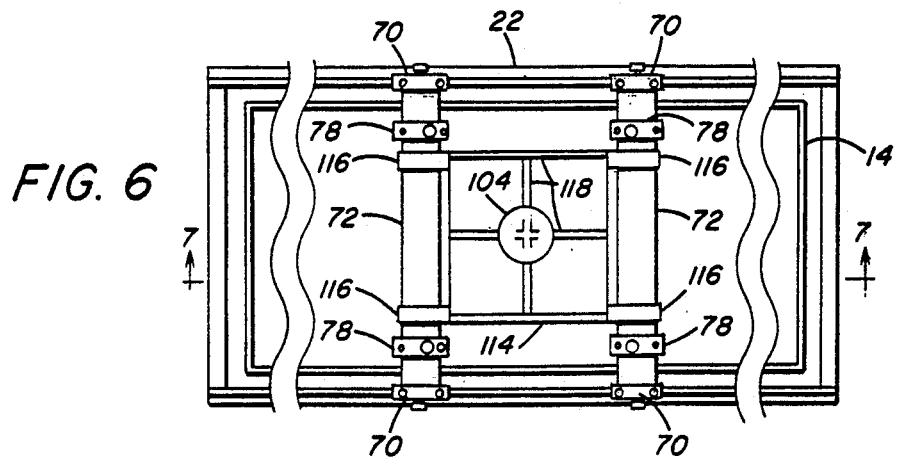
FIG. 6 is a top view of an alternate embodiment of the invention illustrating a vacuum support stand supported from the sheet support frame.

FIGS. 6 and 7 illustrate an alternate embodiment of the invention wherein a central support pedestal 104 is supported from cross beams 72 rather than extending through the tank 14 as discussed earlier. Pedestal 104 includes a vacuum plate 106 and elevating arrangement 108 similar to that discussed earlier. Vacuum line 110 provides vacuum along surface 112 of plate 106. If required shielding (not shown) may be provided to protect the vacuum line 110 from the cutting fluid during the cutting operation. Frame 114 include hangers 116 supported from cross beams 72 and bracing 118 to support the vacuum pedestal 104. As with the preferred embodiment, the arrangement illustrated in FIGS. 6 and 7 supports the glass sheet G independently from the catcher tank 14.

The glass sheet support system as taught in the present invention provides a sheet support arrangement that is completely independent of the abrasive jet and catcher tank in an abrasive jet cutting operation so that any movement of or vibration in the catcher tank is not transmitted to the glass sheet to be cut, and the position of the glass sheet is maintained. The arrangement 16 also provides flexibility in handling different glass sheet sizes and for cutting different part shapes since the glass is supported only at its central region by vacuum plate 46 of pedestal 20 and along its perimeter at discrete locations by glass edge supports 78 on frame 22.

The forms of this invention shown and described in the disclosure represents an illustrative preferred embodiment, and it is understood that various changes may be made without parting from the scope of the present invention as defined in the claims that follow.

I claim:

1. An apparatus for cutting a sheet whereby vibrations of selected components of the apparatus are substantially isolated from one another, the apparatus comprising:
   a base;
   a catcher tank;
   sheet support means;
   edge engaging means;
   means for mounting said edge engaging means above said catcher tank;
   means for securing said edge engaging means directly to said base, said sheet support means above said tank and directly to said base, and said catcher tank directly to said base; and wherein said edge engaging means, said sheet support and said catcher tank are mounted independent from one another whereby vibrations of said edge engaging means, said sheet support column and said catcher tank are substantially isolated from one another.

2. The apparatus as in claim 1 wherein said engaging means includes means to securely hold selected peripheral portions of the sheet and further including means to adjust the position of said edge engaging means.

3. The apparatus as in claim 1 wherein the sheet is a glass sheet.

4. THe apparatus as in claim 1 wherein said means for securing said edge engaging means includes:
 a sheet support column;
 said catcher tank mounted about and surrounding said sheet support column;
 means for isolating exterior of said sheet support column from interior of said catcher tank;
 means for mounting said sheet support means on said sheet support column; and
 means for securing said sheet support means directly to said base.

5. The apparatus as in claim 4 wherein said sheet support column includes a vacuum plate and further including means to vertically adjust said vacuum plate.

6. The apparatus as in claim 4 further including means to secure the sheet to said sheet support column.

7. The apparatus as in claim 2 wherein said securing means is a vacuum plate and further including means to draw a vacuum along a major surface of said plate.

8. The apparatus as in claim 2 wherein said edge engaging means include means to securely hold selected peripheral portions of the sheet.

9. The apparatus as in claim 8 further including means to vertically adjust the position of said sheet support column relative to said edge engaging means.

10. The apparatus as in claim 8 wherein said edge support means includes a frame and further including means to adjustably position said means to securely hold selected peripheral portions on said frame.

11. The apparatus as in claim 10 wherein said frame includes rail members extending along at least a portion of two opposing sides of said tank and cross beams mounted on said rails and further including means to slideably mount one of said cross beams or said rails and said means for mounting said edge engaging means includes means to adjustably mount said edge engaging means on said cross beams.

12. The apparatus as in claim 11 further including means to vertically adjust said sheet support column relative to said edge engaging means.

13. The apparatus as in claim 12 wherein said vertical adjusting means includes a slide member mounted to said sheet support column and means to vertically reciprocate said slide member so as to adjust the vertical position of said sheet support column.

14. A method of cutting a sheet comprising the steps of:
 securing a sheet in position;
 positioning a central portion of the sheet at a lower elevation than edge portions of the sheet, and
 directing a high velocity cutting fluid toward the sheet to cut the sheet.

15. The method as set forth in claim 14 wherein the sheet is a glass sheet.

16. A method of cutting a sheet, comprising the steps of:
 assembling sheet support means, catcher tank, and edge engaging means to a base such that the catcher tank is secured to the base, the sheet support means is mounted above the catcher tank and is secured to the base, the edge engaging means is secured to the base and above the tank, and the vibrations of the sheet support means, the catcher tank and the edge engaging means are substantially isolated from one another;
 securing a sheet on the sheet support means with the edge engaging means engaging the edges of the sheet; and
 directing high velocity cutting fluid toward the sheet to cut the sheet.

17. The method as in claim 16 further including the step of placing major surface of the sheet in compression prior to the practice of said directing step.

18. The method as in claim 17 wherein said placing step includes positioning central portion of the sheet at a lower elevation than the edge portions of the sheet.

19. The method as set forth in claim 18 wherein the sheet is a glass sheet.

* * * * *